June 5, 1962  K. C. ALLEN  3,037,563
WEIGHING SCALES
Filed Feb. 19, 1959  2 Sheets-Sheet 1
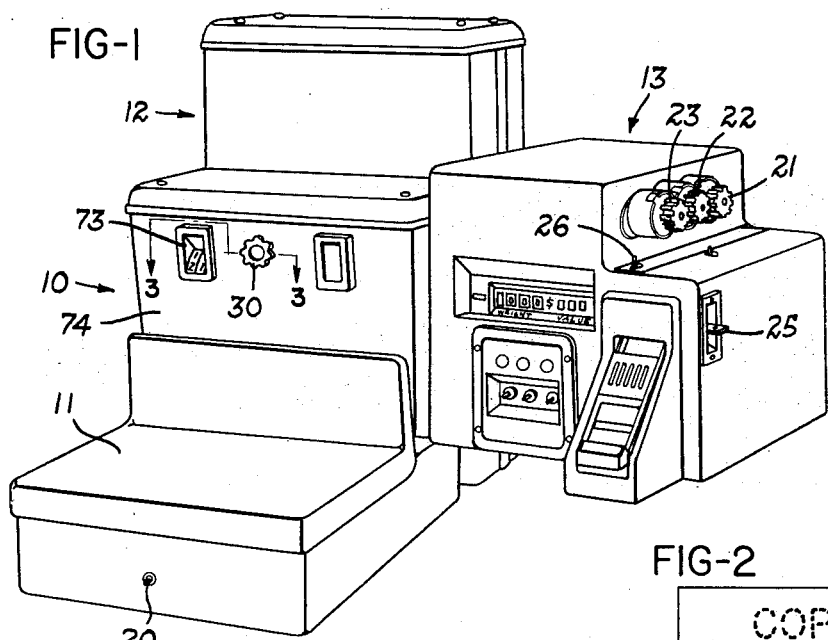
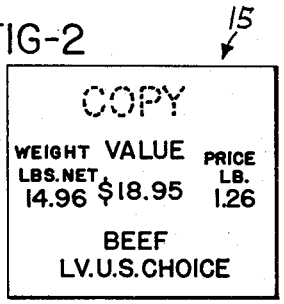
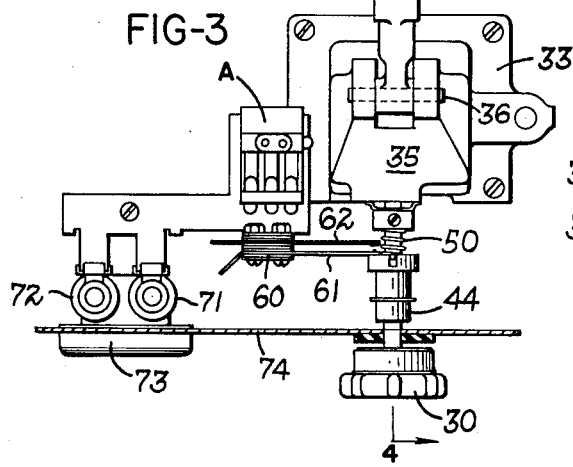
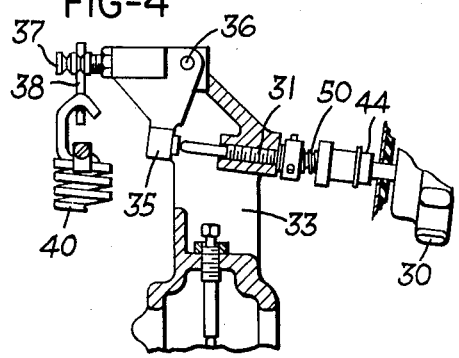
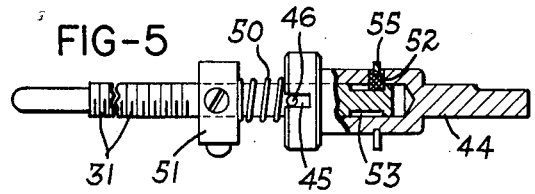
INVENTOR.
KENNETH C. ALLEN
BY
Marechal, Biebel, French & Bugg
ATTORNEYS June 5, 1962
K. C. ALLEN
3,037,563
WEIGHING SCALES
Filed Feb. 19, 1959
2 Sheets-Sheet 2
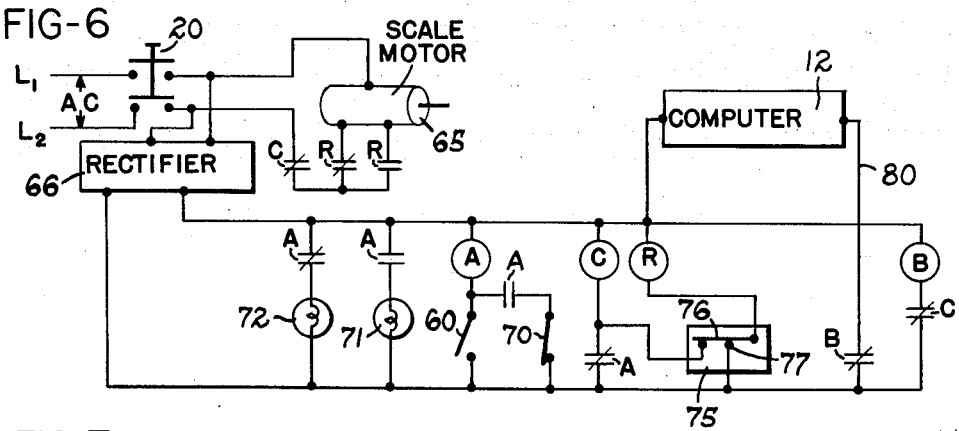
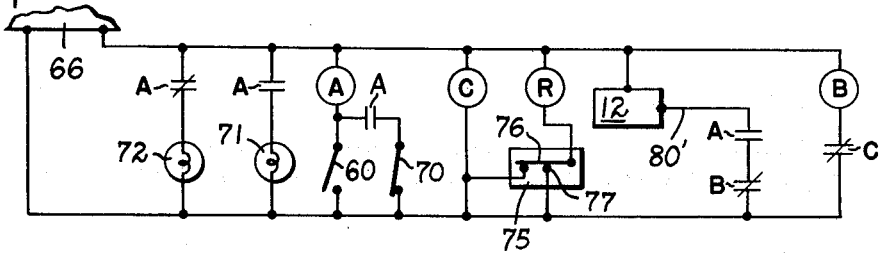
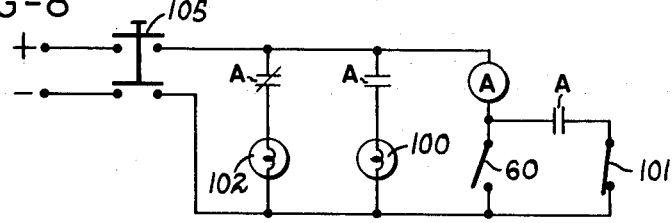
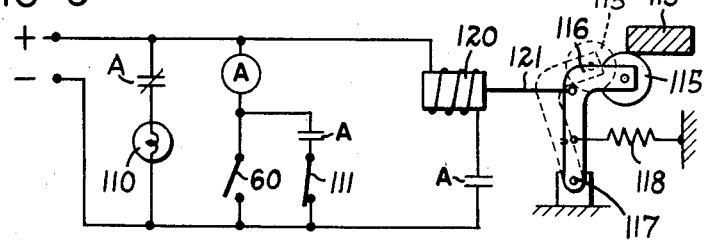
*INVENTOR.*
KENNETH C. ALLEN
BY
Marechal, Biebel, French & Bugg
ATTORNEYS

3,037,563
WEIGHING SCALES
Kenneth C. Allen, Dayton, Ohio, assignor to The Hobart Manufacturing Company, Troy, Ohio, a corporation of Ohio
Filed Feb. 19, 1959, Ser. No. 794,366
16 Claims. (Cl. 177—4)

This invention relates to weighing scales and weighing systems.

The invention has particular application to weighing systems of the type which perform one or more operations in addition to weighing each load, such for example as computing the price of the load, and/or printing a record of data relevant to the load such as weight, value, unit price and/or the nature of the commodity constituting the load. The invention is especially relevant to weighing systems of this type which are used for prepackaging operations wherein a series of successive articles or packages of food or other commodity are weighed and then labelled with an appropriately related printed ticket.

In prepackaging operations where the products are intended to be supplied to the public, it is not only important but in a majority of cases a legal requirement that the weight be recorded as net weight, exclusive of the packaging materials. This in turn requires that the scale component of the weighing system include a tare adjustment to compensate for the weight of the packaging material by correspondingly adjusting the no-load reference position of the weighing mechanism to a position below zero. A further complication resulting from this requirement is that the packaging material for different products may vary to a considerable extent, as is readily apparent in considering an example such as the packaging materials required for one pound of hamburger or for a large sirloin steak.

It is a common practice in prepackaging operations to weigh and label a plurality of loads of the same commodity and then to shift to another commodity, and so forth. If appropriate attention is not given to adjustment of the tare in conjunction with each such change of commodity, there may be a violation of the legal requirements, and also either the customer or the store may be cheated by the resulting excess or insufficient net weight figure. The present invention is concerned with the prevention of such possible improper operating conditions.

The invention is directly related to the fact that in weighing systems of the above type, it is commonly necessary to perform one or more essential actions to condition the system for operation. For example, the scale in a majority of such systems includes electrical components which must be turned on at the beginning of a series of weighing operations, typical such components being an illuminating light and one or more electric motors. In addition, if the system includes a price computer, it must be adjusted to the proper unit price for each commodity, and similarly if the system includes provision for printing a designation of the commodity on each ticket or label, appropriate change in the printing mechanism must be made for each commodity.

It is a primary object of the present invention to provide a weighing system of the general type outlined above which is of such construction and mode of operation that whenever a change is made in the operating conditions, such as a change in the unit price or nature of the commodity being weighed, the system is automatically blocked or disabled from normal operation until appropriate actuation of the tare adjustment has been made.

Another object of the invention is to provide a weighing system of the type which requires application of electric power for operation wherein the initial application of power is ineffective to condition the system for operation, and the system cannot operate until appropriate actuation of the tare adjustment has been made after the power is turned on.

A further object of the invention is to provide a weighing system wherein not only is the system incapable of operation until the tare adjustment has been actuated after the power has been turned on, but wherein also a subsequent change in operating conditions, such as change of unit price or commodity designation, will again block operation of the system until the tare adjustment has been appropriately reset.

It is accordingly a broad object of the invention to provide a weighing system intended for use in the weighing of loads under conditions requiring tare adjustment and of such construction and mode of operation that whenever a change is made in the operating conditions which might require a change of tare, the system is automatically disabled until the manual tare adjustment has been actuated, thereby necessitating the attention of the operator to the question of tare adjustment, and preventing further operation until such attention has been given.

It is a specific object of the invention to provide a weighing system having some or all of the characteristics and advantages outlined above in which actual change of the tare adjustment is not required to condition the system for operation if the change in the nature or unit price of the commodity being weighed is not of such nature that a change of tare must be made, but in which at the same time, the system cannot be conditioned to resume operation after a change of commodity or unit price without attention by the operator to the decision as to whether a change of tare should be made.

Additional objects and advantages of the invention will be apparent from the following description, the accompanying drawings and the appended claims.

In the drawings—

FIG. 1 is a perspective view showing a complete power operated weighing system to which the invention is applicable and which includes a power operated scale, apparatus actuated by the scale for computing the value of the weighed load, and a register for printing and issuing tickets identifying the nature of each weighed load and its weight, unit price and value;

FIG. 2 illustrates a printed ticket of the type issued by the apparatus of FIG. 1;

FIG. 3 is a fragmentary view taken generally as indicated by the line 3—3 of FIG. 1 to illustrate the tare adjusting mechanism;

FIG. 4 is a fragmentary sectional view taken as indicated by the line 4—4 of FIG. 3;

FIG. 5 is a sub-assembly view of the tare adjusting shaft and associated parts;

FIG. 6 is a wiring diagram showing the operation of the form of the invention shown in the form of FIGS. 1–5;

FIG. 7 is another wiring diagram applicable to FIGS. 1–5; and

FIGS. 8 and 9 are wiring diagrams illustrating additional applications of the invention.

Referring to the drawings, which illustrate preferred embodiments of the invention, FIG. 1 illustrates a complete weighing system which is in large measure of the characteristic disclosed in my copending application Serial No. 637,725 filed February 1, 1957 and referred to hereinafter for convenience as Case A. This system includes a power operated scale indicated generally at 10 and incorporating a platter 11 which receives the package or other article to be weighed. The weighing mechanism of scale 10 cooperates with a computing apparatus, represented generally in FIG. 1 by the housing 12, to read out the total weight in terms of pounds and suitable fractions of a pound, and the computer 12 also computes the value of the load in accordance with a preset price per pound.

The scale 10 and computer 12 are interconnected with a register-printer indicated generally at 13, a detailed description of which is found in part in Case A and also in my copending application Serial No. 548,148 filed November 21, 1955, now Patent No. 2,948,465 and referred to hereinafter for convenience as Case B. The register-printer 13 is constructed for cooperation with the scale and computer to print and issue successive printed tickets showing the weight and the unit price and value of each load weighed by the scale, and an example of a ticket produced by the printer 13 is shown at 15 in FIG. 2. The scale 10 is shown as incorporating a main switch 20 controlling the power supply to all its operating parts of the system, and the register-printer 13 is provided with manual control knobs 21, 22 and 23 which correspond to dollars, dimes and cents per pound and are mounted on the outside of the printer casing for presetting the unit price of the commodity being weighed. In addition, the register-printer incorporates an exchangeable key 25 or equivalent member for cooperation with the printer to print the commodity designation on each ticket, and a lever 26 holds the key 25 in place and must be operated when changing keys.

In the normal use of this weighing system as described in Case A, initial conditioning of the system for operation requires turning on of the main switch 20, insertion of the appropriate commodity key 25, and adjusting the knobs 21–23 to the proper unit price setting. The system will function automatically each time a package or other load is placed on the platter 11 to weigh the load, compute its value, and print and issue the appropriate ticket. As already noted, it is customary in such prepackaging operations to handle a considerable number of loads of the same commodity and then to shift to a quantity of loads of another commodity, and so forth. Whenever such shift is made, the operator must know that the commodity key must be changed and also that the price knobs may require changing, and provision has already been made as described in Case B for preventing continued operation of the system following change of the commodity key without change of the price setting. The present invention is directed to construction of the system in such manner that no such change of price or commodity can be made without an accompanying actuation of the tare adjustment of the scale, and further to prevent even initial operation of the system without actuation of the tare adjustment.

Referring particularly to FIGS. 1 and 3, the tare adjustment mechanism includes a manual control knob 30 mounted on the front of the casing of the scale 10. This knob 30 controls a shaft 31 threaded in the top of the column 33 shown fragmentarily in FIG. 4, and the inner end of the shaft 31 engages an arm 35 pivoted at 36 to the upper end of the column 33. The arm 35 includes an extension 37 on which is suspended the hanger 38 which supports the upper ends of the counter-balance springs 40 of the scale weighing mechanism. Threaded adjustment of the shaft 31 will accordingly cause raising or lowering of the hanger 38 to effect corresponding adjustment of the no-load reference position of the scale weighing mechanism.

The knob 30 is not fixed on the shaft 31 but has a splined mounting thereon to provide for sliding movement relative thereto. Referring particularly to FIG. 5, the knob 30 is mounted directly on an extension 44 of the shaft 31 having a hollow inner end portion which telescopes over the outer end of the shaft 31, and the inner end of the shaft extension 44 is slotted at 45 for a driving fit with a radially projecting pin 46 fixed in the shaft 31. A spring 50 is mounted between the shaft extension 44 and a collar 51 fixed on the shaft 31 to bias the shaft extension 44 outwardly of the scale casing, and the outer limit position of the shaft extension 44 is established by a retaining pin 52 which is set in a radial bore in the shaft extension 44 and has its inner end engaged in a circumferential groove 53 in the shaft 31, the pin 52 being held in position by a split retaining ring 55.

As stated, the normal position of the knob 30 and shaft extension 44 is its outward limit position under the biasing force of the spring 50, but it can be pushed inwardly until the pin 46 engages the axially outer end of the slot 45. A mechanical switch 60 is mounted on the standard 33, and the operating arms 61 and 62 of this switch extend into the path of the shaft extension 44 in such manner that these arms are out of contact when the knob 30 is in its normal position but are brought into contact by the inward movement of the knob against the spring 50. The switch 60 may be used in a variety of circuit arrangements to carry out the purposes of the invention, as now described.

In the schematic fragmentary wiring diagram of FIG. 6, the main switch 20 controls the supply lines $L_1$ and $L_2$ of A.C. power for the scale motor 65. A rectifier indicated diagrammatically at 66 supplies D.C. for operating the control relays of the system, which include the balance relay B, control relay C and reversing relay R of Case A. The switch 70 corresponds to the mechanical switch 623 of Case A which is opened each time one of the knobs 21–23 is actuated or the lever 26 is operated for replacement of the commodity key 25.

The light 71 in FIGS. 3 and 6 corresponds to the light 153 of Case A, and it is mounted in side by side relation with an additional light 72 behind the viewing opening 73 in the front 74 of the scale casing as shown in FIGS. 1 and 3. The light 71 is a white light for illuminating the weight dials as indicated in FIG. 6, but the light 72 is preferably red or other distinctive color for the purpose of signaling the existence of an improper condition. These lights are arranged to be lighted alternately, through front and back contacts respectively of a relay A which may conveniently be mounted as indicated in FIG. 3 at the top of the column 33 adjacent the mechanical switch 60 for control thereby as an incident to operation of the tare adjusting mechanism.

In the normal use of the system with the fragmentary control circuits as shown in FIG. 6, when the main switch 20 is closed, the relay C immediately closes through normally closed back contacts of relay A, and also if the scale is in balance, through the switch mechanism 75 which senses the balance position of the scale weighing mechanism. As is indicated diagrammatically in FIG. 6, the sensing switch 75 includes a switch arm 76 having a ground contact 77 which closes both of relays C and R when the scale is in balance, moves down to drop out both of these relays when the scale is moving away from zero under load, and moves upwardly to open only relay C when the scale is moving toward zero. Since relay C is held closed, its back contacts in the energizing circuit for the scale motor 65 will be open, and the scale cannot run even if the sensing switch 75 should be operated by application of a load to the platter. In addition, the red light 72 will be lighted to notify the operator of the existence of these improper operating conditions.

In order to condition the system for operation, it is therefore necessary for the operator to actuate the tare adjustment mechanism sufficiently to close the mechanical switch 60, and for convenient operation the spring 50 will be relatively light so that corresponding light pressure on knob 30 will produce sufficient axial movement thereof to effect contact between the switch arms 61 and 62. As soon as this occurs, the relay A will close and lock itself in through the mechanical switch 70, and similarly the red light 72 will go out and the white light 71 will light. In addition, the back contacts of relay A in series with relay C will open so that relay C can open as required by operation of the sensing switch 75, and relay B can close as soon as relay C opens.

When the weighing mechanism reaches its balance position as described in Case A, the relay C recloses to stop the scale motor 65, and relay B opens to initiate operation of the computer 12 as indicated diagrammatically by the line 80. This cycle can be repeated as often as desired without further adjustment so long as the unit price and commodity remain the same, with each new cycle being initiated by replacement of the load on the platter and with the relay A remaining continuously closed.

Whenever a change is to be made in the commodity being weighed, the operator must replace the key 25 and also make proper adjustment of the knobs 21–23, and when this is done, the mechanical switch 70 will be opened for a sufficient interval to drop out relay A. As soon as this occurs, the conditions revert to what they were when the main switch 20 was first turned on in that the relay C will be held closed, the white light 71 will go out, and the red light 72 will come on. The operator thereby has attention positively called to the necessity for consideration of tare adjustment, since the weighing operation cannot be resumed until the knob 30 has been actuated sufficiently to operate switch 60 as already described.

The switch 60 and its associated relay A can be incorporated at a variety of selected locations in the system provided they cooperate to block complete operation of the system whenever a situation arises which requires consideration of tare adjustment. Thus FIG. 7 shows a fragment of the control circuits of FIG. 6 incorporating a modified arrangement insofar as concerns the location in the system of the blocking contacts of relay A. As shown, in place of the back contacts of relay A in series with relay C, a pair of normally open front contacts of relay A is connected in the line 80′ which sends the starting signal to the computer 12. With this circuit arrangement, if it is attempted to operate the scale after a change of price or commodity key without actuating the tare adjustment, and in spite of the signal provided by the red light 72, the system will operate until the weighing mechanism is in balance, but then when relay B opens as a result of the reclosing of relay C, the front contacts of relay A in the line 80′ will remain open so that the starting signal cannot reach the computer. This circuit arrangement is especially useful in connection with a system generally as shown in Case A but which does not incorporate a power operated scale.

FIG. 8 shows a fragmentary control circuit which is applicable to a computing scale of the type wherein computing is mechanically automatic in accordance with the balance position of a weight chart with relation to the appropriately selected price per pound index. Thus the circuits of FIG. 8 are applicable to a variety of such scales wherein there is a light 100 for illuminating the weight and value chart. The switch 101 corresponds in function to the switch 70 and may be mounted in accordance with the construction of the individual scale in such manner that it is operated whenever the price per pound setting is changed. The relay A and switch 70 corresponds to the same parts as already described in connection with FIGS. 1–7, and the light 102 represents a red light corresponding in function to the light 72.

With this circuit arrangement of FIG. 8, whenever the main switch 105 is first turned on, the red light 102 will light instead of the white light 100, and conditioning of the scale for operation will therefore require actuation of the tare adjustment for temporarily closing the switch 101. The same conditions will reoccur whenever a change is made in the price setting, as a result of the attendant operation of the mechanical switch 101. The circuit arrangement of FIG. 8 is especially applicable to an optical scale such as that shown in Meeker et al. Patent 2,723,113, in which case the white light 100 would correspond to the main light source 200 of the patent and would be turned off to block complete operation of the scale until operation of the tare adjustment.

FIG. 9 shows another fragmentary wiring diagram in which the relay A is caused to control a mechanical stop preventing operation of the scale, and the red light 110 and mechanical switch 111 in FIG. 8 correspond to the light 72 and switch 70 of FIG. 5. A portion of the scale weighing mechanism is represented diagrammatically in FIG. 9 by a fragment of the lever 113, which is normally prevented from moving downward in a weighing operation by the interposition of a mechanical stop comprising a roller 115 carried by an arm 116 pivoted to the main frame at 117 and biased into operative position by a spring 118. The relay A in this arrangement controls a solenoid 120 having its armature connected at 121 to the arm 116 in such manner that when relay A is energized, the solenoid 120 will pull the stop arm against the spring 118 to the dotted line position shown in FIG. 9 to permit free weighing movement of the lever.

It should be understood that the invention is not limited to a computing scale system, since it is equally applicable to a system for weighing and printing a record identifying only the net weight of each load and the particular commodity involved, as for example in the case of food products which are weighed and then frozen for pricing at a later date when they are to be sold. Any of the forms of the invention described above may be applied to such a weighing and labeling system, with the mechanical switch such as switch 70 being arranged for operation as an incident to each change of commodity designation and with the switch corresponding to the switch 60 being appropriately arranged for operation as an incident to adjustment of the tare.

The illustrated construction of the tare adjusting mechanism which makes possible operation of the switch 60 without rotation of the shaft 31 is especially advantageous because there are many occasions in the use of these types of weighing system when a change in the commodity being weighed does not require a change of tare. Thus while arrangement of the switch 60 in such manner that its operation required actual rotation of the shaft 31 would fulfill the main object of the invention, it would also require time and effort on the part of the operator to reestablish the proper tare setting when no change of tare was in fact required. With the preferred form of the invention as shown, it is not necessary to change the tare but it is necessary for the operator to carry out a manual actuation of the tare mechanism, i.e. push the knob 30, whenever a change of tare might be required, thereby avoiding unnecessary loss of time but assuming that the possibility of a necessity, for tare adjustment cannot be ignored.

While the forms of apparatus herein described constitute preferred embodiments of this invention, it is to be understood that this invention is not limited to these precise forms of apparatus and that changes may be made therein without departing from the scope of the invention which is defined in the appended claims.

What is claimed is:
1. A system for weighing loads, comprising a weighing mechanism adapted to be deflected from a no-load reference position to a balance position in proportion to the weight of the load applied thereto, control means requiring actuation by the operator to condition said system for operation, means incorporated at a selected location in said system for blocking complete operation thereof, means effective upon actuation of said control means to cause said blocking action of said blocking means, tare adjusting means for establishing said no-lead reference position of said weighing mechanism, and means responsive to operation of said tare adjusting means for releasing said blocking means.

2. A system for weighing loads, comprising a weighing mechanism adapted to be deflected from a no-lead reference position to a balance position in proportion to the weight of the load applied thereto, presettable means requiring actuation by the operator to condition said system for operation in accordance with the nature of the loads to be weighed, means incorporated at a selected location in said system for blocking complete operation thereof, means responsive to actuation of said presettable means to cause said blocking action of said blocking means, tare adjusting means for establishing said non-load reference position to said weighing mechanism, and means responsive to operation of said tare adjusting means for releasing said blocking means.

3. A system for weighing loads and printing a record of the weight and additional data relevant thereto, comprising a weighing mechanism adapted to be deflected from a no-load reference position to a balance position in proportion to the weight of the load applied thereto, means responsive to establishment of said balance position for printing the corresponding said record, presettable means requiring actuation by the operator to condition said system to print said additional data in accordance with the nature of the loads to be weighed, means incorporated at a selected location in said system for blocking initiation of said printing operation, means responsive to actuation of said presettable means to cause said blocking action of said blocking means, tare adjusting means for establishing said no-load reference position of said weighing mechanism, and means responsive to operation of said tare adjusting means for releasing said blocking means.

4. A system for weighing loads, comprising a weighing mechanism adapted to be deflected from a no-load reference position to a balance position in proportion to the weight of the load applied thereto, control means requiring actuation by the operator to condition said system for initial operation, means incorporated at a selected location in said system for blocking complete operation thereof, means effective upon actuation of said control means to cause said blocking action of said blocking means, tare adjusting means for establishing said no-load reference position of said weighing mechanism, means responsive to operation of said tare adjusting means for releasing said blocking means, adjustable means for selectively presetting said system in accordance with the nature of the loads to be weighed, sensing means responsive to adjustment of said presetting means following said release of said blocking means for again causing said blocking action thereof and thereby requiring re-operation of said tare adjusting means to re-release said blocking means.

5. A system for weighing and computing the value of loads, comprising a weighing mechanism adapted to be deflected from a no-load reference position to a balance position in proportion to the weight of the load applied thereto, means responsive to establishment of said balance position for computing the value of the weighed load, means for presetting said computing means for a desired unit price, means for blocking complete operation of said system, means responsive to operation of said presetting means for actuating said blocking means, tare adjusting means for establishing said no-load reference position of said weighing mechanism, and means responsive to operation of said tare adjusting means for releasing said blocking means.

6. A system for weighing loads, comprising a weighing mechanism adapted to be deflected from a no-load reference position to a balance position in proportion to the weight of the load applied thereto, control means requiring actuation by the operator to condition said system for operation, means incorporated at a selected location in said system for blocking complete operation thereof, means effective upon actuation of said control means to cause said blocking action of said blocking means, tare adjusting means including a handle adapted for manual operation, means supporting said handle for both axial and rotational movement with respect to said weighing mechanism, means responsive to said rotational movement of said handle for changing said no-load reference position of said weighing mechanism, and means responsive to said axial movement of said handle for releasing said blocking means without change of said no-load reference position.

7. A system for weighing loads, comprising a weighing mechanism adapted to be deflected from a no-load reference position to a balance position in proportion to the weight of the load applied thereto, control means requiring actuation by the operator to condition said system for operation, means incorporated at a selected location in said system for blocking complete operation thereof, means effective upon actuation of said control means to cause said blocking action of said blocking means, tare adjusting means including a shaft supported for rotational movement with respect to said weighing mechanism, means responsive to rotational movement of said shaft for changing said no-load reference position of said weighing mechanism, a handle on said shaft for effecting said rotational movement thereof, means forming a splined mounting for said handle on said shaft providing for axial movement of said handle between inner and outer limit positions without causing rotational movement on said shaft, means normally biasing said handle to said outer limit position, and means for releasing said blocking means in response to axial movement of said handle from said outer limit position.

8. A system for weighing loads, comprising a weighing mechanism adapted to be deflected from a no-load reference position to a balance position in proportion to the weight of the load applied thereto, control means requiring actuation by the operator to condition said system for operation, means incorporated at a selected location in said system for blocking complete operation thereof, means effective upon actuation of said control means to cause said blocking action of said blocking means, means responsive to said blocking action of said blocking means for giving a signal thereof, tare adjusting means for establishing said no-load reference position of said weighing mechanism, and means responsive to operation of said tare adjusting means for releasing said blocking means and terminating said signal.

9. A system for weighing loads, comprising a weighing mechanism adapted to be deflected from a no-load reference position to a balance position in proportion to the weight of the load applied thereto, control means requiring actuation by the operator to condition said system for initial operation, means incorporated at a selected location in said system for blocking complete operation thereof, means effective upon actuation of said control means to cause said blocking action of said blocking means, means responsive to said blocking action of said blocking means for giving a signal thereof, tare adjusting means for establishing said no-load reference position of said weighing mechanism, means responsive to operation of said tare adjusting means for releasing said blocking means and terminating said signal, adjustable means for selectively presetting said system in accordance with the nature of the loads to be weighed, sensing means responsive to adjustment of said presetting means following said release of said blocking means for again causing said blocking action thereof and said signal and thereby requiring re-operation of said tare adjusting means to re-release said blocking means and terminate said signal.

10. A system for weighing loads and carrying out at least one additional operation based on the weight of each load, comprising a weighing mechanism adapted to be deflected from a no-load reference position to a balance position in proportion to the weight of the load applied thereto, means including electric circuits cooperating with said weighing mechanism to define a complete cycle for said system incorporating the weighing operation and said additional operation, means responsive to establishment of said balance position for effecting said additional operation, presettable means requiring actuation by the operator to condition said system to carry out said additional operation in relation to the nature of the loads to be weighed, means interposed in said system for blocking completion of said cycle at a predetermined point therein, means responsive to operation of said presettable means for actuating said blocking means, tare adjusting means for establishing said no-load reference position of said weighing mechanism, and means responsive to operation of said tare adjusting means for releasing said blocking means.

11. A system for weighing loads and carrying out at least one additional operation based on the weight of each load, comprising a weighing mechanism adapted to be deflected from a no-load reference position to a balance position in proportion to the weight of the load applied thereto, means including electric circuits cooperating with said weighing mechanism to define a complete cycle for said system incorporating the weighing operation and said additional operation, means responsive to establishment of said balance position for effecting said additional operation, presettable means requiring actuation by the operator to condition said system to carry out said additional operation in relation to the nature of the loads to be weighed, relay means incorporated in said circuits and shiftable between a blocking position causing blocking of said cycle at a predetermined point therein and a release position providing for completion of said cycle, means responsive to operation of said presettable means for causing said relay means to assume said blocking position thereof, tare adjusting means for establishing said no-load reference position of said weighing mechanism, and means responsive to operation of said tare adjusting means for causing shifting of said relay means to said release position thereof.

12. A system for weighing loads and carrying out at least one additional operation based on the weight of each load, comprising a weighing mechanism adapted to be deflected from a no-load reference position to a balance position in proportion to the weight of the load applied thereto, means including electric circuits cooperating with said weighing mechanism to define a complete cycle for said system incorporating the weighing operation and said additional operation, means responsive to establishment of said balance position for effecting said additional operation, presettable means requiring actuation by the operator to condition said system to carry out said additional operation in relation to the nature of the loads to be weighed, relay means incorporated in said circuits and shiftable between a blocking position causing blocking of said cycle at a predetermined point therein and a release position providing for completion of said cycle, means responsive to operation of said presettable means for causing said relay means to assume said blocking position thereof, tare adjusting means including a handle adapted for manual operation, means supporting said handle for both axial and rotational movement with respect to said weighing mechanism, means responsive to said rotational movement of said handle for changing said no-load reference position of said weighing mechanism, and switch means positioned for operation in response to said axial movement of said handle for causing shifting of said relay means to said release position thereof.

13. A system for weighing loads, comprising a weighing mechanism adapted to be deflected from a no-load reference position to a balance position in proportion to the weight of the load applied thereto, means including an electric circuit cooperating with said weighing mechanism in the operation of said system, control means requiring actuation by the operator to condition said system for operation, relay means incorporated in said circuit and shiftable between a blocking position causing blocking of complete operation of said system and a release position, means effective upon actuation of said control means to cause said relay means to assume said blocking position thereof, tare adjusting means for establishing said no-load reference position of said weighing mechanism, and means responsive to operation of said tare adjusting means for causing shifting of said relay means to said release position thereof.

14. A system for weighing loads, comprising a weighing mechanism adapted to be deflected from a no-load reference position to a balance position in proportion to the weight of the load applied thereto, means including an electric circuit cooperating with said weighing mechanism in the operation of said system, control means requiring actuation by the operator to condition said system for operation, relay means incorporated in said circuit and shiftable between a blocking position causing blocking of complete operation of said system and a release position, means effective upon actuation of said control means to cause said relay means to assume said blocking position thereof, tare adjusting means including a handle adapted for manual operation, means supporting said handle for both axial and rotational movement with respect to said weighing mechanism, means responsive to said rotational movement of said handle for changing said no-load reference position of said weighing mechanism, and switch means positioned for operation in response to said axial movement of said handle for causing shifting of said relay means to said release position thereof.

15. A system for weighing loads and carrying out at least one additional operation based on the weight of each load, comprising a weighing mechanism adapted to be deflected from a no-load reference position to a balance position in proportion to the weight of the load applied thereto, means including electric circuits cooperating with said weighing mechanism to define a complete cycle for said system incorporating the weighing operation and said additional operation, control means requiring actuation by the operator to condition said system for initial operation, presettable means requiring actuation by the operator to condition said system to carry out said additional operation in relation to the nature of the goods to be weighed, relay means incorporated in said circuits and shiftable between a blocking position causing blocking of said cycle at a predetermined point therein and a release position providing for completion of said cycle, means effective upon actuation of said control means for causing said relay means to assume said blocking position thereof, tare adjusting means for establishing said no-load reference position of said weighing mechanism, means responsive to operation of said tare adjusting means for causing shifting of said relay means to said release position thereof, and means responsive to operation of said presettable means following said shifting of said relay means to said release position for again causing said relay means to assume said blocking position and thereby requiring reoperation of said tare adjusting means to cause re-shifting of said relay means to said release position thereof.

16. A system for weighing loads, comprising a weighing mechanism adapted to be deflected from a no-load reference position to a balance position in proportion to the weight of the load applied thereto, control means requiring actuation by the operator to condition said system for operation, means responsive to actuation of said control means for giving a signal thereof, tare adjusting means for establishing said no-load reference position of said weighing mechanism, and means responsive to operation of said tare adjusting means for terminating said signal.

References Cited in the file of this patent

UNITED STATES PATENTS

| | | |
|---|---|---|
| 951,777 | Denison | Mar. 8, 1910 |
| 1,687,852 | Pulz | Oct. 16, 1928 |
| 1,690,679 | Hebden | Nov. 6, 1928 |
| 2,678,206 | Muldoon | May 11, 1954 |
| 2,806,685 | Sande | Sept. 17, 1957 |
| 2,882,035 | Lauler | Apr. 14, 1959 |

UNITED STATES PATENT OFFICE
CERTIFICATE OF CORRECTION

Patent No. 3,037,563                            June 5, 1962

Kenneth C. Allen

It is hereby certified that error appears in the above numbered patent requiring correction and that the said Letters Patent should read as corrected below.

Column 3, line 10, for "characteristic" read -- characteristics --; column 7, lines 9 and 14, for "no-lead", each occurrence, read -- no-load --; line 23, for "non-load" read -- no-load --; line 24, for "to" read -- of --.

Signed and sealed this 30th day of October 1962.

(SEAL)
Attest:

ERNEST W. SWIDER
Attesting Officer

DAVID L. LADD
Commissioner of Patents